(No Model.)
N. McASLAN.
INCUBATOR.
No. 540,107. Patented May 28, 1895.
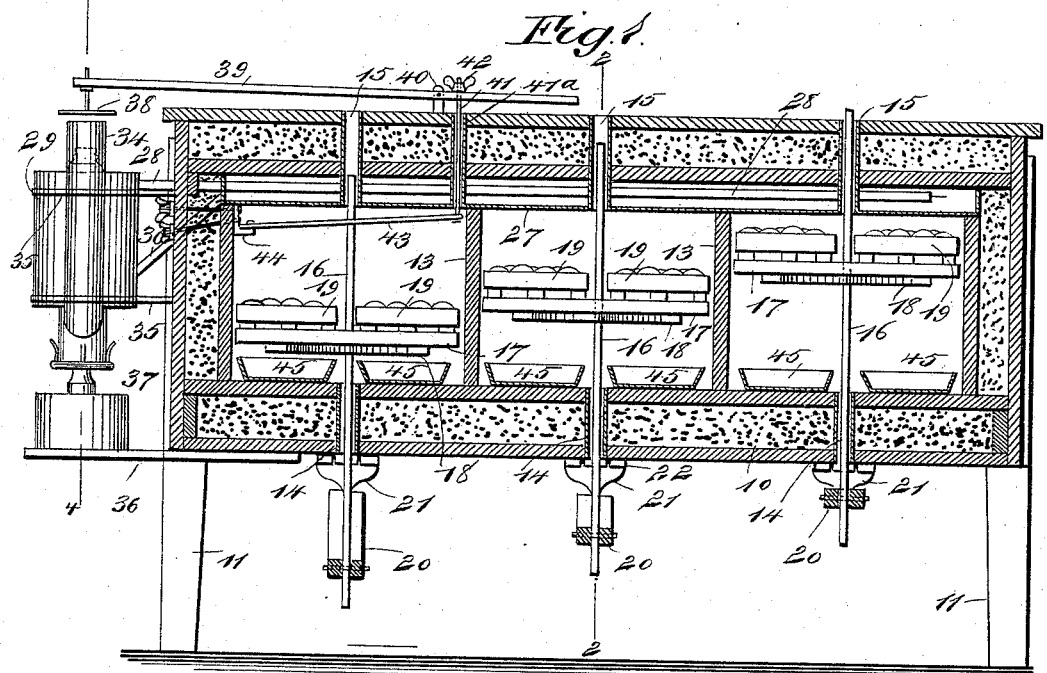
Fig. 1
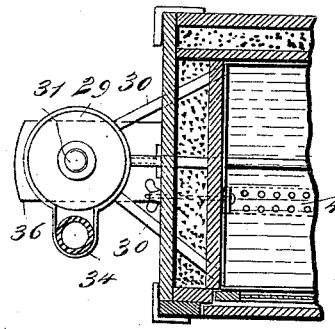
Fig. 3
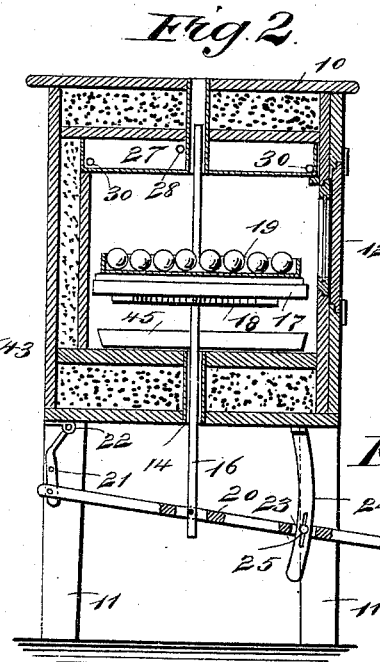
Fig. 2
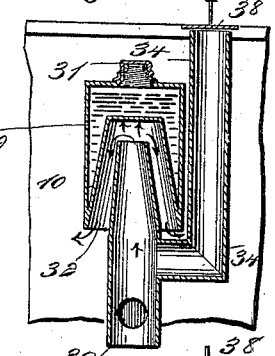
Fig. 4
Fig. 5
WITNESSES:
F. McArdle.
A. Lireott
INVENTOR
N. McAslan
BY Munn & Co.
ATTORNEYS.

UNITED STATES PATENT OFFICE.

NORMAN McASLAN, OF BRIGGS, NEBRASKA.

INCUBATOR.

SPECIFICATION forming part of Letters Patent No. 540,107, dated May 28, 1895.

Application filed March 16, 1894. Serial No. 503,881. (No model.)

*To all whom it may concern:*

Be it known that I, NORMAN McASLAN, of Briggs, in the county of Douglas and State of Nebraska, have invented a new and Improved Incubator, of which the following is a full, clear, and exact description.

My invention relates to improvements in incubators and in the heating apparatus therefor; and the object of my invention is to produce a cheap and simple incubator which is arranged in a series of compartments adapted to contain eggs to be hatched, which has the egg trays in the several compartments arranged in such a way that the eggs may be subjected to different degrees of heat, according to the length of time which they have been in the incubator, which has a perfect means of ventilation, which has its heating apparatus constructed and arranged so that the temperature may be controlled to a nicety, which has a thermostatic device to regulate the heat, and which also can be easily regulated by hand if desired.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a longitudinal section of the incubator embodying my invention, showing the egg-trays arranged at different heights therein. Fig. 2 is a vertical cross-section on the line 2 2 of Fig. 1. Fig. 3 is a detail sectional plan of one end of the incubator and of the heater. Fig. 4 is a detail vertical section through the heater and heat-controlling flues on the line 4 4 of Fig. 1, showing the heat-regulating valve closed; and Fig. 5 is a similar section, but with the heat-regulating valve open.

The incubator has a body 10, which may be of any approved construction, having the customary double walls and being preferably mounted on legs 11.

The incubator has on its front side the customary double doors 12 and it is divided by the transverse partitions 13 into a series of compartments adapted to contain the eggs to be hatched, the drawings showing three such compartments, though any desired number may be used.

The incubator is provided at the bottom with ventilating tubes 14, there being one for each compartment, and at the top with similar tubes 15, which open from the tops of the compartments through the top wall of the incubator, and these tubes 14 and 15, besides providing for the necessary circulation of air, also serve as guides for the rod 16 which move vertically through them and extend below the incubator bottom, each rod being pivoted to an adjusting lever 20 which projects in front of the incubator case, so that it can be conveniently grasped, and at its rear end the lever is pivoted to a link 21 which is hinged to the case bottom, as shown at 22.

The lever 20 is slotted near its front end, as shown at 23, so as to receive the quadrant 24 which is fastened to the case bottom and depends therefrom, and the lever may be held at any necessary height on the quadrant by means of a thumb screw 25 which projects through the quadrant and into the lever. Any other suitable device may be used for holding the lever at the required height.

The portion of the rod 16 which projects through the chamber of the incubator is provided with a platform 17 which is braced on the under side, as shown at 18, and is adapted to support the removable egg trays 19.

The heating device is in the top of the incubator, and it will be seen that by means of the lever mechanism just described, the platforms may be adjusted at any desired height, and thus made to subject the eggs to the required heat. By having the several compartments and the adjusting devices for each of them, eggs may be introduced to the incubator at different times.

The incubator has, in the top, a heating tank 27 adapted to contain hot water or steam, this being introduced to the tank through a pipe 28 which extends longitudinally into the tank and throughout the greater part of its length, the pipe connecting at its outer end with a heater 29 which is supported on one end of the incubator, as described presently. The return of the circulation is effected through the pipes 30 which extend from one end of the tank 27 to the heater 29, the pipes entering the heater near its lower end.

The heater is provided with a removable cap 31 on top, to enable it to be conveniently filled, and the bottom of the heater is recessed or concaved, as shown at 32 in Fig. 4, so that it may present a large heating surface to the heat which rises from the chimney flue 33, which flue projects well up into the recess in the heater bottom. The flue 33 has a side flue 34 which projects upward above the heater top so as to provide for the necessary draft. The heater flues are held in suitable brackets 35 which are fastened to the end of the incubator.

The heater is arranged above a shelf 36 which is also fastened to the incubator, and on this shelf is adapted to rest a lamp 37, the lamp being arranged just beneath the flue 33 so that the whole heat from the chimney will pass upward through the flue 33 and be delivered against the heater bottom, as shown in Fig. 4.

Above the side flue 34 is a valve 38, which is adapted to close the top of said flue, and it will be seen that when the valve is closed, the effective heat will all be delivered beneath the heater so that the water in it will be quickly and efficiently heated, but if the water becomes too hot, the valve 38 is raised and this makes a side draft through the flue 34 which draws the hot air to one side, as illustrated in Fig. 5, and also draws cool air up through the recess 32 of the heater bottom and down through the upper part of the flue 33, and in this way the heater and its contents are quickly cooled to the necessary extent. I have shown a thermostat for operating the valve, this thermostatic arrangement being preferably constructed as follows:

The valve 38 is hung on the free end of the lever 39 which is fulcrumed on the top of the incubator, as shown at 40, and the lever is, behind its fulcrum, connected by a rod 41 which is adjustable, by means of a thumb nut 42, with a thermostat 43 which is arranged in the incubator, the rod 41 extending downward through a suitable tube 41ª, as shown clearly in Fig. 1. The thermostat is secured to a bracket 44 and comprises two strips of metal, which strips are bound together and are of different degrees of expansibility, so that when the temperature grows relatively low, the thermostat curls upward so as to tilt the lever 39 and close the valve 38, thus utilizing the greatest amount of heat for heating the water in the heater, and when the temperature gets relatively high, the thermostat curls down, thus opening the valve and permitting the heat to escape in the manner already indicated. The cooler air is drawn into the incubator through the tubes 14, while the hot air escapes through the tubes 15 which may be provided with covers to assist in controlling the heat. In the lower part of the incubator are placed pans 45 containing water, the vapor of which gives the necessary moisture to the atmosphere and eggs.

It will be seen that the heating apparatus is very simple, that the incubator may be quickly built, that the trays may be regulated so as to be just the required distance from the heating tank and consequently heated to the necessary extent, and that as a result the incubator works very nicely.

Having thus described my invention, I claim as new and desire to secure by Letters Patent—

In an incubator, the combination with a case having in its top and bottom an opening leading from the egg chamber, of a vertical rod working in the said openings, the lower end of the rod extending to the outside of the case, a platform secured upon the rod in the egg chamber, a link pivoted to the bottom of the case, a lever to which the rod is pivoted, said lever being pivoted to the link and having its front end slotted, a quadrant secured to the case and projecting through the slot of the said lever, and means for clamping the lever to the quadrant, substantially as described.

NORMAN McASLAN.

Witnesses:
SAMUEL REYNOLDS,
CHARLES FREDERICK SCHRAM.